Dec. 30, 1969   R. J. GREENLER   3,486,878
CHAMBER FOR THE MANUFACTURE OF FLOAT GLASS WITH A GRAPHITE
LINER OF VARIED THICKNESS
Filed Dec. 6, 1967   2 Sheets-Sheet 1

ROBERT J. GREENLER
INVENTOR

BY John R. Faulkner
William E. Johnson
ATTORNEYS

Dec. 30, 1969    R. J. GREENLER    3,486,878
CHAMBER FOR THE MANUFACTURE OF FLOAT GLASS WITH A GRAPHITE
LINER OF VARIED THICKNESS
Filed Dec. 6, 1967    2 Sheets-Sheet 2

ROBERT J. GREENLER
INVENTOR
BY John R. Faulkner
William E. Johnson
ATTORNEYS

United States Patent Office 3,486,878
Patented Dec. 30, 1969

3,486,878
CHAMBER FOR THE MANUFACTURE OF FLOAT GLASS WITH A GRAPHITE LINER OF VARIED THICKNESS
Robert J. Greenler, Monroe, Mich., assignor to Ford Motor Company, Dearborn, Mich., a corporation of Delaware
Filed Dec. 6, 1967, Ser. No. 688,467
Int. Cl. C03b 18/02
U.S. Cl. 65—182         6 Claims

ABSTRACT OF THE DISCLOSURE

A chamber utilized in the "float process" of manufacturing glass has a molten metal bath contained in the bottom thereof. The bottom of the chamber is defined by refractory material having a liner of carbonaceous material thereover. The liner is formed so as to be of generally progressive thickness from a thin portion in the central portion of the chamber to a thick portion near the sidewalls of the chamber to promote heat uniformity across the width of the bath.

BACKGROUND OF THE INVENTION

This invention relates to the construction of a chamber for utilization in the manufacture of flat glass by the so-called "float process." In the "float process" molten glass is poured on the surface of a molten bath contained in a chamber to obtain a glass ribbon having true parallelism of its opposite faces and a lustrous, fire-polished finish.

Generally, in the "float process" the molten bath is formed from metal having a density greater than that of molten glass. By known means, the molten glass is delivered at a uniform rate to the surface of the molten bath to form a ribbon of glass. The ribbon is then advanced along the surface of the bath under thermal conditions which permit the leading portion thereof to continuously harden to a degree sufficient to permit its removal from the bath without harm to the surfaces thereof. Upon its removal from the chamber, the ribbon of glass passes through an annealing lehr and is subjected to further conventional processing.

The molten bath, which suports the glass, is contained within a substantially enclosed chamber having upper and lower refractory sections joined by side and end wall structures. The end wall structures have therein entrance and exit passageways through which, respectively, the molten glass is fed to and the glass ribbon removed from the chamber. The lower refractory section forms the container for receiving and supporting the molten metal bath. The space within the chamber above the bath is filled with a protective atmosphere to prevent oxidation of the metal forming the bath.

The "float process" of manufacturing glass has been improved by lining at least a portion of the chamber containing the molten metal bath with slabs of a carbonaceous material. Such slabs, usually made from graphite, are positioned in the chamber in a manner and for a purpose more fully discussed in copending U.S. patent application Ser. No. 497,949, filed Oct. 19, 1965, now U.S. Patent 3,393,061 and assigned to the same assignee as this application.

An advancement over prior float chambers found in the utilization of a carbonaceous liner therein is found in the fact that the carbonaceous liner chemically interacts with oxygenous impurities of both the atmosphere and the molten metal bath so as to purge the "float chamber" system of impurities which would otherwise contaminate it. When a prior art, non-carbon lined chamber is utilized in the "float process" of manufacturing glass, there is a tendency for foreign contaminants seeping into the system to react selectively with the metal forming the molten bath. When the metal is tin, the reaction products, such as a tin oxide, are drawn by some mechanism into the surface of the glass contacting the tin in the chamber and subsequently cause a defect known as "bloom." "Bloom" is the descriptive title applied to glass in which tin oxides on the surface thereof become iridescent upon reheat of the glass to bending temperature and thus, becomes visible to the eye.

The utilization of a carbonaceous liner also has other advantages. More particularly, a carbonaceous liner will act as a thermal conductor and will conduct heat from the hotter central portion of the chamber to the sidewalls of the chamber. Generally, the carbonaceous material is a better conductor of heat than is the molten metal forming the bath. Thus, the bulk of the conductive heat transfer in the chamber is through the carbonaceous material.

The utilization of the carbonaceous liner of uniform thickness across the width of the chamber has increased the amount of heat transfer from the central portion of the chamber to the sidewalls of the chamber in various functionally classified zones of the chamber. However, the temperature profile is not uniform across the width of a float chamber lined with a single thickness of a carbonaceous material such as graphite. More particularly, in a graphite lined chamber, the temperature at the sidewall of the flow-out zone of the chamber will be from 75° F. to 150° F. cooler than the temperature at the central portion of the chamber in that same zone. It is, of course, desirable to have a uniform, or as nearly uniform as possible, temperature profile across the entire width of the float chamber in the various functional zones thereof so the glass ribbon in the chamber will be subjected to uniform conditions across its entire width.

SUMMARY OF THE INVENTION

This invention is directed to the construction of a chamber utilized in the "float process" of manufacturing glass and, more particularly, the invention is directed to a construction for such a chamber which results in a more nearly uniform temperature profile being established across the width of the float chamber in various functional zones thereof wherein a carbonaceous liner is employed.

The chamber for manufacturing glass is constructed in accordance with the principles and teachings of this invention in the following manner. Refractory ceramic is utilized to define a cavity, the cavity receiving molten metal therein which defines a bath for supporting a glass ribbon thereon. The glass ribbon is formed by pouring molten glass out upon the metal bath at the entrance end of the chamber. A carbonaceous liner is employed over the bottom surface of at least a portion of the refractory material defining the cavity. The liner is of generally progressive thickness from the central portion of the chamber outwardly toward each of the sidewalls of the chamber. A more uniform temperature profile is established across the width of the chamber constructed in accordance with the principles and teachings of this invention because a greater amount of heat may be carried through the thicker liner material at the cooler sidewalls of the chamber. However, a differential does remain between the temperature in the center of the chamber and the temperature at the sidewalls of the chamber although this differential is not as great as the differential that exists in a chamber having a lining of uniform thickness. The reduction in temperature differential means that there is a reduced thermal driving force in the areas displaced from the center of the chamber toward the sidewalls of the chamber. This reduction in thermal driving force is compensated for in the construction of the chamber of this invention by increasing the thickness of the carbonaceous material employed to line the chamber whereby a greater amount of heat may be carried therethrough from the center of the chamber to the sidewalls thereof.

DESCRIPTION OF THE PREFERRED EMBODIMENT

Figure 1:
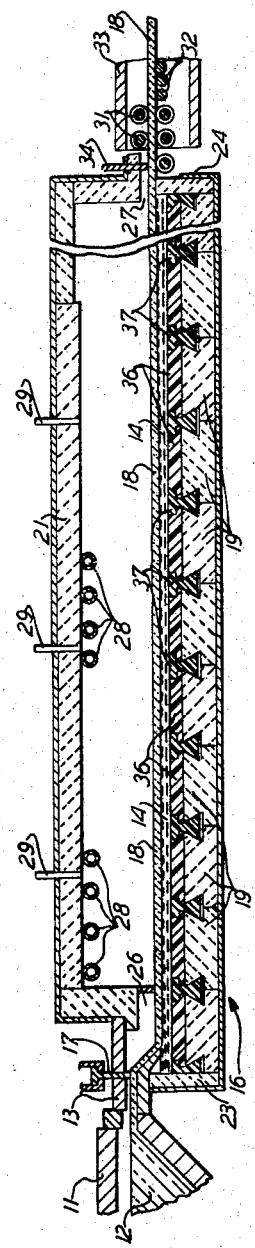
FIGURE 1 is an elevational view, in cross section, showing the improved chamber of this invention for utilization in the manufacture of flat glass.

Referring now to the drawings, in FIGURE 1 there is seen the delivery end of a conventional glass melting furnace 11 in which a constant level of glass 12 is maintained. The molten glass 12 is delivered through a forehearth 13 onto the surface of a bath 14 of molten metal contained within a chamber, generally identified by the numeral 16. A tweel 17 controls the rate of glass 12 flowing from the furnace 11. The molten bath 14 has a density greater than that of the glass 12 so that the glass will flow on the surface thereof. By delivering molten glass at a constant rate and by withdrawing a continuous sheet of glass thus formed at a constant rate, a continuous ribbon of glass 18 of uniform width is produced. Preferably, the bath 14 is molten tin but an alloy of tin may also be utilized.

The chamber 16 comprises a lower refractory section 19, an upper refractory section 21, refractory side blocks 22 and refractory end walls 23 and 24, all of which refractory walls or sections are both formed from a plurality of refractory blocks and joined together except for a restricted entrance 26 and exit 27 to provide the substantially enclosed chamber 16. The refractory side blocks 22 and the refractory end walls 23 and 24 project above the top surface of the lower refractory section 19 to define the cavity or container for the bath of molten tin 14.

To maintain the tin in a molten condition and the glass ribbon 18 at the proper temperature required to form a ribbon of good optical quality, electrical heaters 28 (FIGURE 1) are installed in the roof of the chamber 16. Coolers may also be provided in zones of the chamber 16 to assure that the glass ribbon 18 will be sufficiently cooled and hardened to be removed through the exit 27 without damage to the ribbon. The electrical heaters 28 are connected to a conventional power source (not shown) and may be individually controlled to provide the desired thermal gradient between the various zones of the chamber 16 thereby to obtain the desired rate of cooling of the ribbon 18 as it progresses through the various zones of the chamber. Preferably, the molten glass 12 is introduced into the chamber 16 at a temperature of about 1850° F. and then, as the glass solidifies to form the ribbon 18, it is progressively cooled to a temperature of about 1100° F. at the exit 27.

An atmosphere gas is introduced into the chamber 16 through gas inlets 29 in order to provide a protective atmosphere within the chamber above the molten tin and glass floating thereupon. The atmosphere gas should be inert towards both carbonaceous material and the tin making up the bath and actively reducing towards tin oxide. Also, the atmosphere gas should contain not more than traces of oxygen, carbon dioxide or water vapor.

The cooled glass ribbon 18 is withdrawn by driven traction rolls 31 onto a conveyor 32 to enter an annealing lehr 33 where the ribbon 18 is further cooled under controlled conditions to proper flatness and residual stress level. The exit 27 of the chamber 16 may be provided with a sealing member 34 to retain the protective atmosphere gas in and prevent the entrance of outside atmosphere into the chamber 16.

Figure 2:
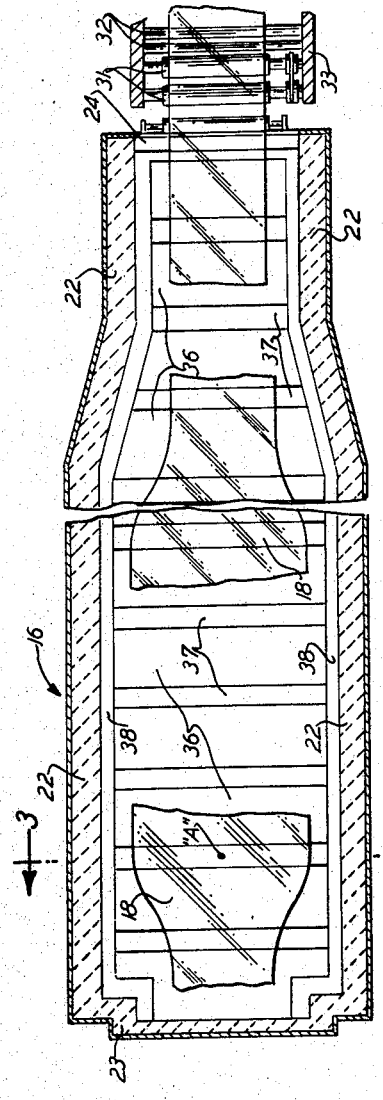
FIGURE 2 is a plan view, in cross section, of the improved chamber of FIGURE 1.

As described in previously mentioned copending patent application S.N. 497,949, a series of rectangular slabs 36, preferably of solid carbonaceous material, such as graphite, are provided in the chamber 16. As best seen in FIGURE 2, the slabs 36 are installed so as to cover the entire bottom area of the chamber 16. While in accordance with teachings of this invention, the carbonaceous slabs 36 are formed in different manners, such as depicted in FIGURES 3 and 5, the description following immediately below is generic to both embodiments disclosed and, therefore, no mention will be made of the particular embodiment of the liner material utilized at this point in the specification.

Figure 3:
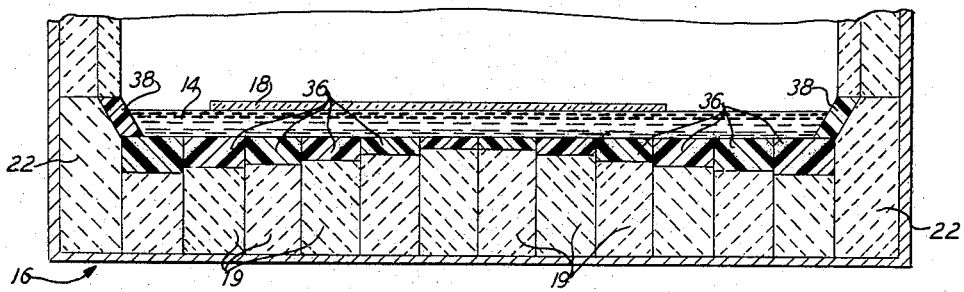
FIGURE 3 is a transverse, sectional view of the improved chamber taken along line 3—3 of FIGURE 2 showing, in detail, features of one embodiment of the chamber of this invention.
Figure 5:
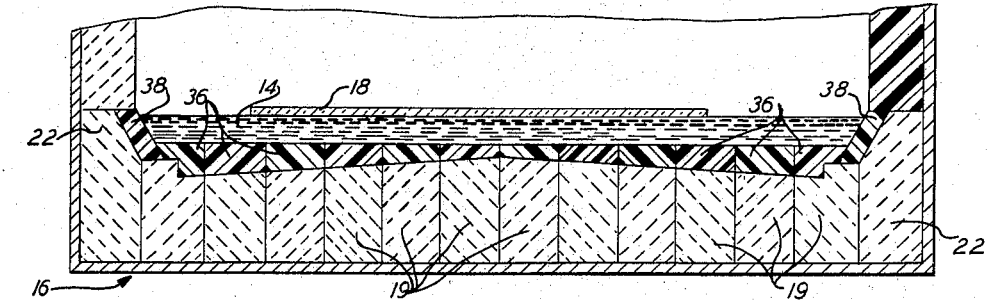
FIGURE 5 is a transverse, sectional view of the improved chamber similar to FIGURE 3 but showing an alternate form for the chamber of this invention.

While in FIGURE 2 the individual slabs 36 are shown as running the full width of the chamber 16, it should be appreciated that the slabs 36 are preferably coextensive with the individual refractory blocks defining the lower refractory section 19, as is illustrated in FIGURES 3 and 5. More particularly, the number of slabs 36 utilized to line one width of the chamber 16 is preferably both equal in number to and compatible in size with the number of refractory blocks necessary to define one width of the lower refractory section 19. The slabs 36 are generally coextensive with the refractory block such that upon utilization of the chamber if any upheaval occurs in the lower refractory section, the individual liner slabs 36 will readily adjust to the situation and there will be no buckling or cracking of a unitary piece of graphite material.

With reference to FIGURES 1 and 2, each slab 36, or transverse series of slabs, is held in position by transversely extending keys 37. The keys are generally shorter in length than the slabs and a greater number of keys extend across the width of the chamber. The manner of utilizing the keys and slabs is described in the above mentioned copending patent application Ser. No. 497,949. The keys 37 are made from the same material as the slabs 36.

The slabs 36 and keys 37, since they are preferably made from a carbonaceous material such as graphite, which material is substantially less dense than the tin, are raised above the lower refractory section 19 by a buoyant force exerted thereon by the molten tin. The graphite slabs and keys do not rise to the top surface of the tin and float thereupon because of the manner in which the keys 37 are held by the lower refractory section 19. A depth of tin bath above the slabs 36 is maintained at a level of from ½ to 4 inches in order to reduce the likelihood of the glass ribbon coming into contact with the slabs or keys if and when the glass ribbon buckles within the chamber 16.

As best seen in FIGURES 3 and 5, the refractory side blocks 22 extend above the top surface of the lower refractory section 19. A sidewall liner 38 comprising one continuous, or in the alternative, several slabs of carbonaceous material such as graphite, is mounted by suitable members (not shown) adjacent the side blocks 22 for the entire length of each side of the chamber 16. The sidewall liner 38 is utilized to provide protection for the side refractory block 22 in the event that the glass ribbon 18 ruptures and a portion thereof moves toward the sidewall of the chamber 16. A construction for the sidewall liner 38 is shown in U.S. patent application Ser. No. 637,733, filed May 11, 1967 and assigned to the same assignee as this application.

In accordance with the principles and teachings of this invention, the slabs of carbonaceous material 36 utilized to line the chamber 16 are constructed in such a manner that the slabs in the central portion of the chamber are thinner than the slabs at the outside edges of the chamber so that a greater cross sectional area is available for conductive heat transfer at the outside edges of the chamber.

More particularly, with reference to FIGURE 3 of the drawings, the individual carbonaceous liner blocks 36, in accordance with a first embodiment of the invention, are formed such that each block has a uniform thickness but adjacent blocks from the center of the chamber to the edges have an increased thickness. In a typical chamber utilized for the manufacture of flat glass by the "float process," the slabs 36 of carbonaceous material in the central portion of the chamber would have a thickness of approximately 1.5 inches and the slabs at the outside edge of the chamber would have a thickness of approximately 4 inches. The slabs located between these two extremes would have a uniformly increased thickness. It is, of course, obvious that the individual refractory block making up the lower refractory section 19 could be of generally decreasing height so as to compensate for the increased thickness of the liner blocks 36 or the bottom wall of the chamber could be tapered. Such a construction permits a uniform and level surface to be presented to the molten tin bath 14 utilized in the chamber 16. Likewise, the dimensions of the keys 37 would be adjusted for each different size of slab such that each individual slab could be anchored in its proper position within the chamber.

Figure 4:
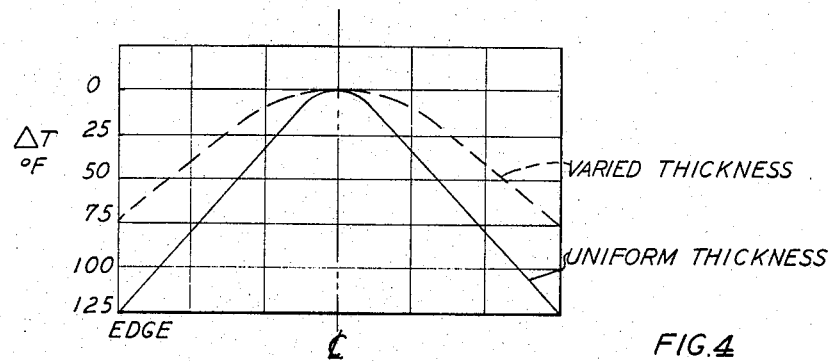
FIGURE 4 is a graphical representation of both a temperature profile across the improved chamber in the flow-out zone thereof and a temperature profile across the same zone of a chamber employing a carbonaceous liner having a substantially uniform thickness.

With reference now to FIGURE 4, there is depicted therein a graphical representation of the approximate temperature profile across the width of the chamber 16 at the point designated A in FIGURE 2. The point designated A in FIGURE 2 is located in the flow-out zone of the chamber where the mloten glass 12 is poured out on the molten tin bath 14 to form the ribbon 18. As is indicated in FIGURE 4, the temperature profile across the chamber, when slabs of a uniform thickness of graphite material are utilized to line the chamber, is such that the edges of the chamber are at a temperature of approximately 75° F. to 150° F. cooler than the central portion of the chamber. As is also indicated in the graph of FIGURE 4, when a variable thickness lining of carbonaceous material is utilized in the chamber, a more uniform temperature profile is established across the chamber and the outside edges thereof have a temperature difference from the central portion of the chamber of only 50° F. to 100° F., or approximately a 30% improvement. A greater uniformity in the temperature profile across the chamber and the ribbon of glass supported therein is desirable in that thermal distortions are not introduced into the glass ribbon. The uniform temperature profile across the chamber also permits the molten glass to flow out to its equilibrium thickness in the least possible travel down the length of the chamber.

In FIGURE 5 an alternate embodiment of the construction of a float chamber in accordance with the principles and teachings of this invention is shown. More particularly, in the alternate construction, the carbonaceous liner is tapered from the central portion of the chamber to the outside edges of the chamber. The taper involved in this particular construction is such that adjacent slabs 36, across the width of the chamber, have the same thickness at the contacting interfacial area therebetween. This construction of a carbonaceous liner also provides the more uniform temperature profile across the chamber and the glass ribbon supported therein.

It should be observed from FIGURE 4 that there is a temperature variation across the width of the chamber 16 even with the incorporation of a carbonaceous liner constructed in accordance with the principles and teachings of this invention. The temperature differential across the width of the chamber is, of course, the driving force for moving heat through the solid carbonaceous material. By increasing the thickness of the liner, in the areas of the chamber remote from the central portion thereof, a greater amount of heat may move from the central portion of the chamber to the outside edges thereof because the driving force, although reduced at the outside edges, is active on a greater cross sectional area.

There has been disclosed herein embodiments of a construction of a chamber for the utilization in the manufacture of flat glass by the "float process." The chamber of this invention is equipped with a carbonaceous liner at least in portions of selected zones thereof. The liner is constructed such that it rapidly transfers heat from the central portion of the chamber to the outside edges of the chamber thereby to establish a substantially uniform temperature profile across the full width of the chamber.

What is claimed is:

1. A chamber for the manufacture of flat glass which comprises: refractory ceramic material defining a cavity for receiving and supporting a molten metal bath; and a liner of graphite material in at least a portion of the chamber, said liner being of generally progressive thickness from a thin portion in the central portion of the chamber toward a thick portion near the sidewalls of the chamber to promote heat uniformity across the width of the bath.

2. A chamber for the manufacture of flat glass which comprises: refractory ceramic material defining a cavity for receiving and supoprting a molten metal bath therein; a liner of graphite material over at least a portion of said material defining said cavity, said liner being of increased thickness from a thin portion thereof in the central portion of the chamber to thick portions thereof adjacent both sidewalls of the chamber to promote heat uniformity across the width of the bath.

3. A chamber for the manufacture of flat glass which comprises: refractory ceramic material defining a cavity for receiving and supporting a molten tin bath therein; a liner formed of slabs of graphite material positioned on the top surface of said refractory ceramic material to protect said refractory ceramic material, said graphite material having a substantially higher thermal conductivity than said molten tin, said liner being of generally progressive thickness from a thin portion in the central portion of the chamber to a thick portion adjacent the sidewalls of the chamber to promote heat uniformity across the width of the bath.

4. A chamber for the manufacture of flat glass which comprises: refractory ceramic material defining a cavity; molten tin received in said cavity for forming a molten metal bath upon which molten glass may be poured to establish a ribbon of glass; a liner of graphite material covering at least a bottom portion of the length and width of said cavity defined in said refractory ceramic material, said liner of graphite material forming a relatively flat and level surface facing toward said ribbon of glass established on said molten tin bath, said liner of graphite material further having a variable thickness across the bottom width of the chamber with a thin portion of said liner being located in the central portion of the chamber and thick portions of said liner being located near the sidewalls of the chamber to promote heat uniformity across the width of the bath.

5. The improved chamber for the manufacture of flat glass as defined in claim 4 wherein said graphite liner is formed from a plurality of graphite slabs, wherein the thickness of each slab is uniform, and wherein the thickness of adjacent slabs increases from the central portion of the chamber to the outside sidewalls of the chamber.

6. The improved chamber for the manufacture of flat glass as defined in claim 4 wherein said graphite liner is formed from a plurality of graphite slabs, wherein each of said slabs is of uniformly increasing thickness, and wherein adjacent slabs across the width of the chamber have the same thickness at the contacting interfacial area therebetween.

References Cited

UNITED STATES PATENTS

| | | | |
|---|---|---|---|
| 1,554,268 | 9/1925 | Ferngren | 65—346 X |
| 3,399,985 | 9/1968 | Greenler | 65—374 |

S. LEON BASHORE, Primary Examiner

E. R. FREEDMAN, Assistant Examiner

U.S. Cl. X.R.

65—65, 99, 103, 337, 374